United States Patent [19]

Golden et al.

[11] Patent Number: 4,915,538

[45] Date of Patent: Apr. 10, 1990

[54] SUPPORT FOR A BICYCLE TYPE SEAT

[76] Inventors: Robert C. Golden, 24110 Denise, Apt. 12-A, Mt. Clemens, Mich. 48043-3869; Martin J. Neumeyer, 5165 Hamshire Dr., Utica, Mich. 48087

[21] Appl. No.: 286,189

[22] Filed: Dec. 19, 1988

[51] Int. Cl.⁴ .................................................. F16B 2/00
[52] U.S. Cl. ..................................... 403/362; 297/195; 403/372; 403/373
[58] Field of Search ................ 297/195, 331, 201, 204; 403/362, 366, 372, 373; 74/551.1, 551.2, 551.8, 551.9, 551.3

[56] References Cited

U.S. PATENT DOCUMENTS

| 491,578 | 2/1893 | Mercer | 297/195 X |
| 780,850 | 1/1905 | Williams | 403/362 |

Primary Examiner—Dennis L. Taylor
Assistant Examiner—Carol I. Bordas
Attorney, Agent, or Firm—Jay C. Taylor

[57] ABSTRACT

A support for a bicycle type seat provides a pair of brackets depending from the seat structure and clamped to opposite sides of a rigid block having a post receiving hole therethrough for freely receiving a seat supporting post. A sidewall of the post receiving hole is recessed to provide a pair of impact ridges extending parallel to the axis of the hole. Post clamping bolts are provided to screw through the block against a seat supporting post in the hole to force the post against the ridges and embed the same into the post, whereby a post within a wide range of diameters can be positively secured against rotation within the hole. A tubular reinforcement having an axially extending expansion slit may be forced axially into a tubular seat supporting post to prevent a collapse of the latter when forced against the impact ridges. Also preferably the block is provided with bolt receiving holes forwardly and rearwardly of the post receiving hole for passage of bolts that clamp the depending brackets to the block. One of the bolt receiving holes curves about the axis of the bolt within the other bolt receiving hole to enable pivotal adjustment of the brackets and seat about the latter axis.

11 Claims, 1 Drawing Sheet

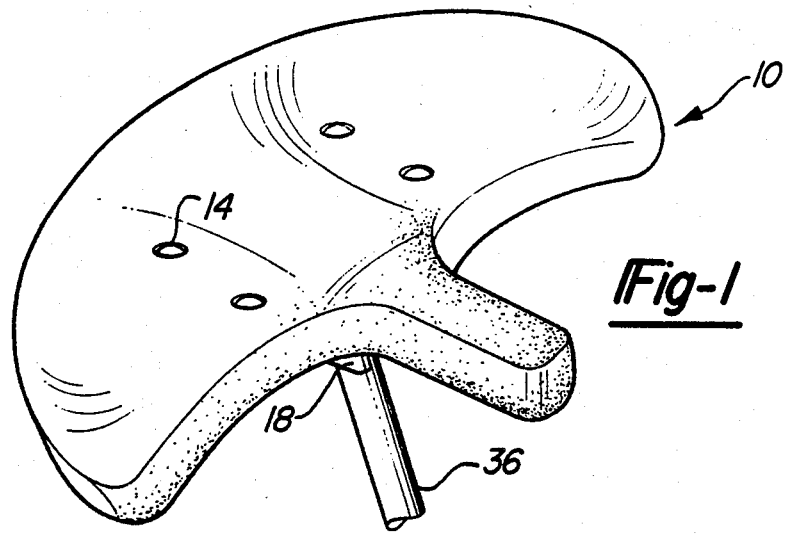
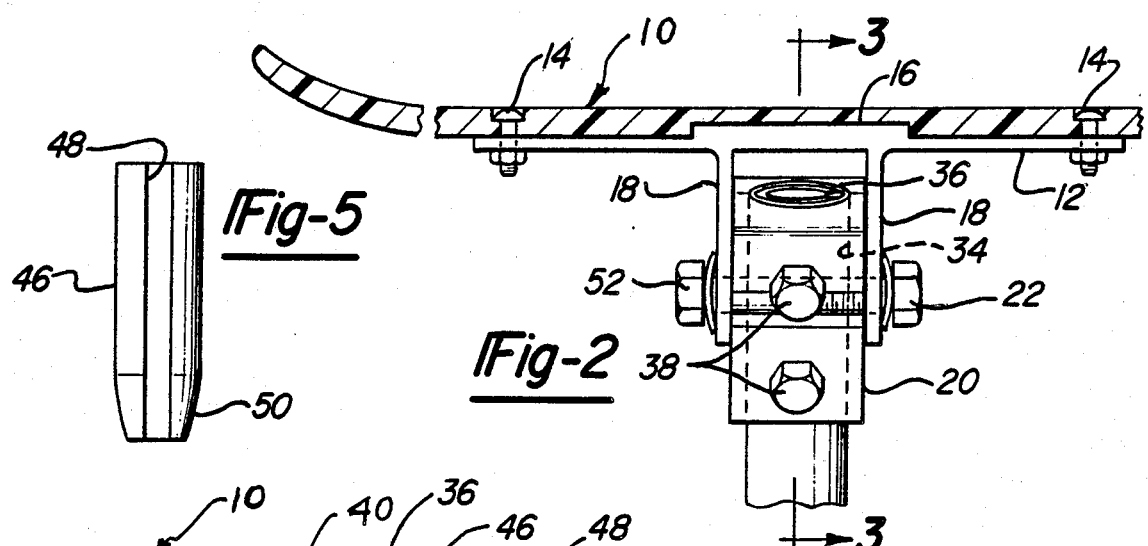
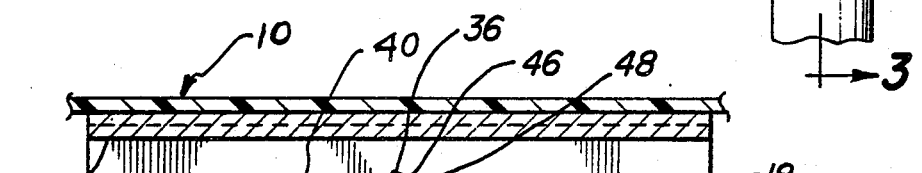
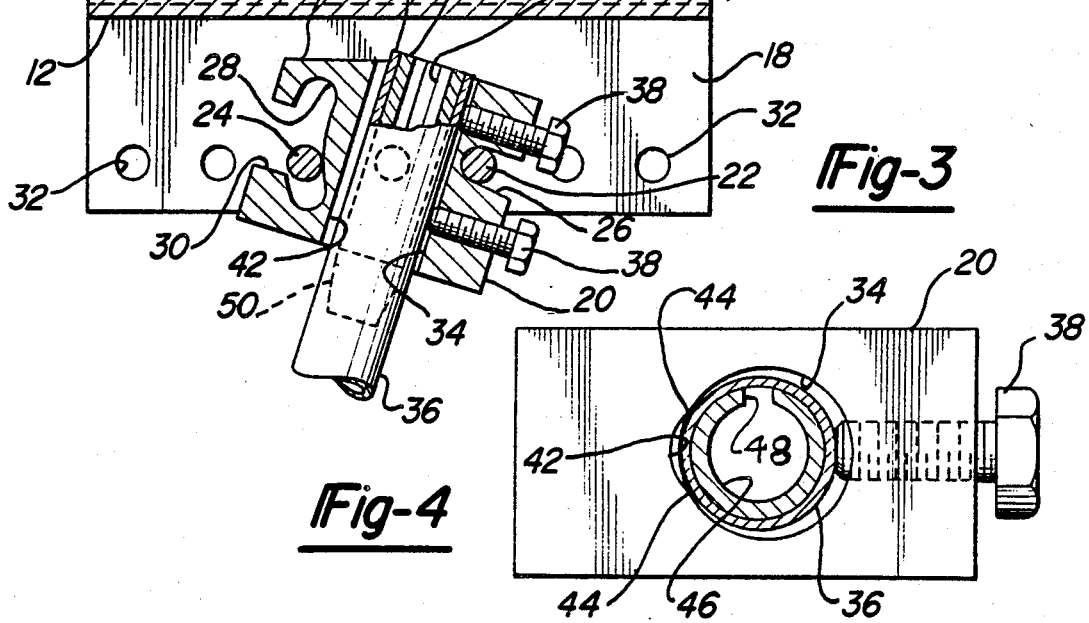

SUPPORT FOR A BICYCLE TYPE SEAT

This invention relates to seats or saddles for bicycles, exercycles, tricycles, mopeds, motorcycles, and the like referred to herein as seats or bicycle-type seats, and specifically relates to a mounting for such a seat on a conventional seat-supporting post.

It is conventional in bicycles for example to provide an upright seat-supporting post suitably secured to and supported by the bicycle frame and to mount a seat adjustably on the support. Such seats usually provide a comparatively small seating surface that exerts only nominal leverage tending to twist the seat relative to the supporting post during cycling movements of the rider. However such seats are notoriously uncomfortable. Seats that provide a comfortable broad seating area are preferred by the occasional cyclist. When a comparatively broad seating surface is provided, the cycling movements exert appreciable torsional forces against the seat support and tend to twist the seat out of its desired adjusted position unless the structure is specifically reinforced.

OBJECTS OF THE INVENTION

An important object of the present invention is to provide a simple economically manufactured and maintained seat support that is particularly adapted to withstand appreciable leveraged forces tending to deform the support for a large comfortable seat or to twist the seat out of its desired adjusted position.

Another important object is to provide such a support and adapter means that enables the support to be mounted universally on conventional seat-supporting posts of various diameters.

In a preferred embodiment of the invention, the seat is provided with a support having a pair of sturdy depending clamping brackets spaced by an essentially solid mounting block of rigid material and firmly clamped between the brackets by clamping bolts located forwardly and rearwardly of a post receiving hole. The latter is provided in the block for freely receiving a conventional generally upright seat supporting post.

Typically the seat supporting post is firmly mounted on the bicycle frame and may comprise a tubular cylindrical rod. The post mounting provided by the bicycle is structured to accommodate a post of a specific diameter and to engage it firmly around its periphery for an axial extent sufficient to support the post adequately without deforming it. However where it is desired as in the present instance to provide a seat support having universal means for firmly mounting a comfortable large area seat on seat supporting posts of various diameters, a difficult problem arises. Applicants have solved the problem involved by providing a cylindrical post receiving hole sufficiently oversized to freely receive essentially any conventional seat supporting post, regardless of its diameter. In addition, the interior surface of the post receiving hole is provided with a channel parallel to the cylindrical axis of the post receiving hole. The channel may comprise a circular arc of smaller diameter than the cylindrical post receiving hole and dimensioned to provide a pair of sharp axially extending circumferentially spaced impact ridges at the intersections between the channel and post receiving hole. Screw threaded bolts are suitably screwed through the block into the post receiving hole at locations diametrically opposite the channel so as to engage a seat supporting post within the hole and force it against the impact ridges, thereby to clamp a post of any ordinary diameter securely within the hole therefor.

A few conventional seat supporting posts are sufficiently sturdy to withstand the localized clamping forces thereagainst when the diametrically extending bolts are tightened to secure the post firmly within the supporting block. However, typical seat supporting posts are comparatively thin walled tubular structures that are readily deformed or collapsed when clamped within the block in accordance with the present invention, such that the post might twist or bend at the location of the deformation to be rendered unuseable. Therefore, in order to enable use of applicants' seat supporting structure with essentially any conventional bicycle, another object of the invention is to provide simple means for reinforcing conventional seat supporting posts where required so as to adapt a post of any customary diameter for use with applicants' standardized mounting block.

A preferred reinforcement comprises a hollow cylindrical spring steel insert having an axially extending expansion slot or slit in its sidewall, i.e., to provide a cylindrical insert of C-section having an outer diameter larger than the inner diameter of any ordinary tubular seat supporting post and capable of being constricted circumferentially by reason of the slit so as to be insertable axially into the post. Within the post, the insert will expand resiliently until its outer cylindrical surface firmly engages the inner cylindrical surface of the post in reinforcing relationship.

Another object of the invention is to provide simple and improved means for retaining the mounting block in various adjusted positions between the clamping brackets, whereby the block may be secured against fore and aft movement by a pair of clamping bolts located forwardly and rearwardly respectively of the post receiving hole, may be adjusted pivotally about a transverse axis, and may be readily assembled within or removed from the depending clamping brackets merely by removing one of the clamping bolts.

In applicants' preferred structure, a pair of transverse fore and aft bolt receiving holes are provided in the block at locations forwardly and rearwardly respectively of the post receiving hole. The pair of clamping bolts extend transversely through the depending brackets and the bolt receiving holes so as to confine the block therebetween against fore and aft movement. One of the bolts provides a pivot enabling pivotal adjustment of the block. The hole for the other bolt has an arcuate portion concentric with the pivot to enable the pivotal adjustment. The fore and aft bolt holes respectively open forwardly and rearwardly of the block to enable passage of their respective bolts to and from the block, such that the block may be readily installed between or removed from the brackets upon the removal of only one of the pair of clamping bolts.

Other objects of this invention will appear in the following description and appended claims, reference being had to the accompanying drawings forming a part of this specification wherein like reference characters designate corresponding parts in the several views.

Although no prior art is known to applicants that teach their invention as described herein, the following references located in a preliminary search are illustrative of the art:

| U.S. Pat. No. | | | Issue or Publication Date |
|---|---|---|---|
| U.S. Pat. No. | 3,501,119 | Rich, Jr. | 3-17-70 |
| | 3,970,345 | Holcomb | 7-20-76 |
| | 4,502,811 | Patriarca | 3-5-85 |
| | 4,568,121 | Kashima | 2-4-86 |
| Canada | 1,159,350 | Jakob | Not known |
| U.K. | 407,436 | Jelley et al | Not known |
| France | 1,359,864 | Galet/Gallet | 3-23-64 |
| | 908,884 | Durand | 5-21-46 |
| Netherlands | 7,908,081 | UNIKAP NV. | 5-11-79 |

The patent to Rich -119 shows the overall structure of a seat supported on a platform having the depending flanges 43 and 43' confining a post clamping block 59 therebetween by means of a bolt 51.

The above noted references disclose various adjustable mountings for a seat. Holcomb —345, Canada —350, and France —884 show longitudinal adjustment, and the British patent —436 illustrates an elongated slot $d^4$ enabling pivotal adjustment about an axis f. Also the spaced clamps $d^3$ disclose the concept broadly for clamping a post b of various diameters. Similarly the French patent —864 discloses the members, 1, 6 for clamping posts of various diameters. The French patent —884 also illustrates the concept of an arcuate slot 5 to accommodate pivotal adjustement.

The Dutch patent —081 illustrates a resilient mounting 11 cooperating with a parallelogram linkage comprising members 5 and 6 pivotally connected to the post supporting block 3 and to the seat support 1.

It is apparent that none of the above noted references teaches applicants' concept of the solid rigid block having the oversized post receiving hole as claimed in cooperation with the channel opening into the oversized hole to provide sharp impact ridges for embedding into the post when urged thereagainst by diametrically opposed tightening bolts; nor the foregoing in combination with the transverse bolt receiving holes located in the block fore and aft of the post for receiving clamping bolts that clamp the spaced clamping brackets firmly to the block in any adjusted position, wherein the fore and aft bolt receiving holes also open forwardly and rearwardly respectively to enable assembly of the block with the clamping brackets merely by the removal of one of the clamping bolts; nor the latter in combination with the resilient slit tubular reinforcement insertable axially at an interference fit into a tubular post to resist deformation when the post is forced against the parallel impact ridges at the intersections between the cylindrical post receiving hole and the parallel channel in its sidewall.

DESCRIPTION OF THE DRAWINGS

FIG. 1 is an isometric view of a seat of the general type with which the invention is involved, seen generally from above.

FIG. 2 is a longitudinal fragmentary enlarged vertical midsectional view through the seat of FIG. 1.

FIG. 3 is a fragmentary view taken substantially in the direction of the arrows along the line 3—3 of FIG. 2.

FIG. 4 is an enlarged sectional view transversely of the seat supporting post looking downwardly at the mounting block to show the latter clamped to the post prior to being clamped between the brackets of the seat support.

FIG. 5 is an isometric view of the reinforcement that is insertable into the tubular seat supporting post.

It is to be understood that the invention is not limited in its application to the specific details described herein, since the invention is capable of other embodiments and of being practiced or carried out in various ways, and that the phraseology or terminology employed herein is for the purpose of describing the invention claimed in the appended claims.

DESCRIPTION OF A PREFERRED EMBODIMENT

Referring to the drawings, a preferred embodiment of the invention is illustrated by way of example with a bicycle type seat 10 having an unusually large seat surface somewhat comparable to the seat surface of an agricultural vehicle and dimensioned to conform comfortably to the anatomy of a rider. Because of the broad lateral extent of the seat 10, customary seat supports cannot satifactorily support the seat against torsional movements tending to rotate the seat or twist the supporting structure in consequence of pedal action by the rider.

As illustrated in FIG. 2, the seat 10 is mounted and secured to a support or platform 12 by a plurality of bolts 14 preferably countersunk into the upper surface of the seat. The latter may comprise a rigid molded resin and may be molded conventionally with the platform 12 to provide a unitary structure. In the present instance, the platform 12 may comprise a molded resin or a formed metal such as a hardened aluminum and is provided with a central portion 16 offset upwardly to engage a mating recess in the seat 10. The offset 16 cooperates with the bolts 14 to prevent lateral movement of the seat 10 with respect to the platform 12. If desired, the seat 10 may be covered with a padding as is conventional.

Integral and comprising a unitary extruded structure with the platform 12 are a pair of parallel spaced clamping brackets 18 spaced by a thick solid block 20 of generally rectangular shaped and preferably formed from a hardened aluminum alloy. The block 20 is securely clamped between the brackets 18 by tightening a pair of transversely extending bolts 22 and. 24. The rear bolt 22 is closely confined within a transversely extending and rearwardly opening bolt hole 26 in the block 20. The forward bolt 24 is confined within an arcuate transversely extending bolt hole 28 which also has a wide forward opening 30 to facilitate passage of the bolt 24 into and out of the opening 28 when the bolt 22 is not in place. Alternatively, if the bolt 24 is not in place, the block 20 can be assembled with or removed from the bolt 22, in place as shown, via the rearwardly opening transverse hole 26. Thus only one bolt 22 or 24 need be removed to enable assembly or separation of the block 20 and clamping brackets 18.

The brackets 18 are provided with a plurality of bolt holes 32 spaced longitudinally for receiving the bolts 22 and 24 and enabling adjustment of the entire seat support assembly 12, 20 forwardly or rearwardly from the position shown in FIG. 3. Once adjusted, the forward and rearward transversely extending surfaces of the bolts 22 and 24 snugly engage the adjacent transversely extending surfaces of the block 20 to confine the latter against longitudinal movement even before the bolts 22, 24 are tightened to clamp the brackets 18 against the parallel lateral sides of the block 20.

Extending generally upright and freely through a cylindrical hole 34 in the block 20 is a conventional seat supporting post 36 that is secured to the block 20 as described below by bolts 38. Tilting of the block 20 about the axis of the bolt 22 to the extent permitted by the arcuate slot 28 is accomplished by loosening the bolts 22 and 24. In this regard, the upper surface of the block 20 is champfered at 40 to enable downward tilting of the forward end of the seat 10 to a generally horizontal position when the post 36 inclines rearwardly as is customary.

The post 36 for supporting the seat structure may be conventional and may vary in diameter from one-half of an inch to an inch. The usual diameter is approximately seven-eighths of an inch or a little less. The bore or hole 34 extends completely through the block 20 and is sufficiently oversized to enable free passage of any conventional seat supporting post 36 with which the present invention is concerned. The forward portion of the bore 34 is relieved by a parallel channel 42 that provides a pair of sharp impact ridges 44 extending longitudinally of the post 36 and adapted to imbed thereinto when the block 20 is forced rearwardly with respect to the post 36 by tightening the pair of bolts 38.

The channel 42 may comprise a portion of a cylindrical recess of smaller diameter than the cylindrical hole 34 and parallel thereto, such that the impact ridges are also parallel to the cylindrical axis of the hole 34. The bolts 38 screw into the block 20 through threaded screw holes that open diametrically into the cylindrical hole 34 diametrically opposite the channel 42 so as to engage the rear cylindrical surface of the post 36. When the bolts 38 are tightened against the post 36, the latter will be slightly deformed and pressed tightly against the comparatively sharp ridges 44 that also extend completely through the block 20 in parallelism with the post 36. The post 36 is thus positively prevented from rotating with respect to the block 20. Presumably the post 36 might even be deformed and forced slightly into the channel 42 to enhance its interlock with the block 20.

The lower end of the post 36 is conventionally supported in the bicycle frame that is designed to accommodate and firmly support the post 36 for which it is designed without appreciably deforming the latter. The present invention however is concerned with the provision of a universal mounting that will operate satisfactorily with a variety of bicycle types and seat supporting posts 36 of various diameters. Occasionally a seat supporting post may comprise a solid rod or may be sufficiently sturdy to enable clamping by the bolts 38 without serious deformation. Typically however the conventional seat supporting post comprises a comparatively thin walled tubular structure that readily collapses when the bolts 38 are tightened thereagainst.

It is accordingly within the concept of the present invention to provide a tubular reinforcing insert 46 having an outer diameter slightly larger than the largest interior diameter of any normally to be encountered post 36 and having an axially extending expansion slit 48 throughout dimensioned to enable circumferential contraction of the insert 46 to a diameter less than the interior diameter of any normally to be encountered post 36. The insert 46 may be chamfered at its lower end at 50 to facilitate insertion into the upper end of the post 36 and has sufficient hardness and resilience to expand radially outwardly against the interior of the post 36 and to conform firmly thereto in reinforcing relationship at an interference fit so as to resist deformation of the post 36 when the bolts 38 are tightened.

In application of the present invention, the seat 10 and support 12 may be provided as separate elements as shown or as a durable one piece structure. They are preferably provided as a package, loosely preassembled or not as desired, with the block 20, insert 46, and bolts 22, 24, and 38 for use with a bicycle type vehicle having a customary tubular seat supporting post 36. The reinforcement 46 is then inserted axially, chamfered end 50 first, at least partially into the upper end of the tubular post 36 that is supplied by the user, i.e., the owner of the bicycle. Thereafter the insert 46 is forced or hammered to the final position illustrated in FIG. 3.

The insert 46 may be provided in various sizes, as for example with a medium undeformed external diameter for use with posts 36 of medium to small internal diameters, and with a larger undeformed external diameter for use with large to medium diameter posts 36. After insertion of the reinforcement 46, the block 20 is sleeved over the upper end of the post 36 and the bolts 38 are tightened to secure the assembled post 36 and block 20 positively together. Tightening of the bolts 38 will cause the impact ridges 44 to imbed into the adjacent exterior of the post 36. Also the post 36 may bulge somewhat into the channel 42. Usually, the inner ends of the bolts 36 will also imbed somewhat into the exterior of the post 36, but radial collapse of the post 36 upon tightening of the bolts 38 is prevented by the reinforcement 46. Except for the post receiving hole 34, 42 and the bolt holes 26 and 28, 30, the block 20 is preferably solid between its lateral parallel edges that are clamped by the parallel brackets 18 and comprises a hardened material that is essentially undeformed by the clamping action.

The seat 10 may then be suitable adjusted forwardly or rearwardly by selection of the adjustment holes 32, and may be adjusted pivotally along the arcuate adjustment slot 28, whereupon the bolts 22, 24 are tightened by means of their accompaning nuts 52.

We claim:

1. In a support having self adjusting means for mounting bicycle type seats on conventional seat supporting posts within a broad range of diameters, the combination of a pair of depending brackets, a rigid block spacing said brackets, means for clamping said brackets securely against the sides of said block, said block having a post receiving hole therein, the sidewall of said hole having channel means therein extending parallel to the longitudinal axis of said hole, said channel means intersecting the sidewall of said hole at a pair of impact ridges parallel to said axis, and means for forcing a seat supporting post out of axial alignment with respect to said hole and against said ridges to embed the latter into said post comprising bolt means in screw threaded engagement with said block and extending from the exterior thereof into said hole in opposition to said channel means.

2. The combination according to claim 1, said brackets having confronting surfaces spaced by said block, said block having opposite lateral surfaces parallel to and clamped between said confronting surfaces by said means for clamping, said post receiving hole opening at the underside of said block for receiving an upper end of a seat supporting post, said block having forward and rearward bolt receiving holes extending therethrough and located forwardly and rearwardly respectively of said post receiving hole, said means for clamping comprising a pair of bolts extending through said brackets and bolt receiving holes, one of said bolts in one of said bolt receiving holes providing a pivot axis for pivotal adjustment of said block, the other of said bolt receiving holes having a portion curving about said pivot axis to enable said adjustment.

3. The combination according to claim 2, means for confining said block against forward and rearward movement comprising forwardly facing and rearwardly facing portions of said block engaging said bolts respectively in said forward and rearward bolt receiving holes, and said forward and rearward bolt receiving holes also opening forwardly and rearwardly respectively for passage of said bolts to and from their respective bolt receiving holes from the exterior of said block to enable removal of said block from said brackets upon the removal of only one of said bolts from its bolt receiving hole.

4. The combination according to claim 3, and means for resisting collapse of a tubular seat supporting post within said post receiving hole when said bolt means is tightened to force said post against said ridges comprising a tubular reinforcement having an axially extending expansion slit therein and dimensioned for insertion axially into the tubular post at an interference fit.

5. The combination according to claim 4, said block comprising a solid hard material throughout its extent between its lateral surfaces except for screw threaded holes therein for said bolt means, said post receiving and bolt receiving holes, and said channel.

6. The combination according to claim 2, and means for resisting collapse of a tubular seat supporting post within said post receiving hole when said bolt means is tightened to force said post against said ridges comprising a tubular reinforcement having an axially extending expansion slit therein and dimensioned for insertion axially into the tubular post at an interference fit.

7. The combination according to claim 1, and means for resisting collapse of a tubular seat supporting post within said post receiving hole when said bolt means is tightened to force said post against said ridges comprising a tubular reinforcement having an axially extending expansion slit therein and dimensioned for insertion axially into the tubular post at an interference fit.

8. The combination according to claim 1, and in addition a tubular seat supporting post freely insertable axially into said post receiving hole, and means for resisting collapse of said post when the latter is forced against said ridges by said bolt means comprising a tubular reinforcement extending axially within said tubular post throughout the region thereof engageable by said bolt means, said reinforcement having an axially extending expansion slit therein, the exterior of said reinforcement conforming closely to the interior of said tubular post at an interference fit.

9. The combination according to claim 8, said support being symmetrical with respect to a vertical midplane and said brackets having confronting surfaces spaced by said block and parallel to said midplane, said block having opposite lateral surfaces parallel to and clamped between said confronting surfaces by said means for clamping, said post receiving hole having a central axis in said midplane and opening at the underside of said block for receiving an upper end of said seat supporting post, said block having forward and rearward bolt receiving holes extending transversely therethrough normally to said midplane and located forwardly and rearwardly respectively of said post receiving hole, said means for clamping comprising a pair of bolts extending transversely through said brackets and bolt receiving holes, one of said bolts in one of said bolt receiving bolt holes providing a pivot axis for pivotal adjustment of said block, the other of said bolt receiving holes having an arcuate portion for enabling said adjustment.

10. The combination according to claim 9, said bolts in said forward and rearward bolt receiving holes engaging forwardly facing and rearwardly facing portions respectively of said block for confining said block against forward and rearward movement, and said forward and rearward bolt receiving holes also opening forwardly and rearwardly respectively for passage of said bolts to and from their respective bolt receiving holes from the exterior of said block to enable removal of said block from said brackets upon the removal of only one of said bolts from its bolt receiving hole.

11. The combination according to claim 10, said block comprising a solid hard material throughout its extent between its lateral surfaces except for screw threaded holes therein for said bolt means, said post receiving and bolt receiving holes, and said channel means.

* * * * *